(12) United States Patent
Sarmah

(10) Patent No.: US 8,762,533 B2
(45) Date of Patent: Jun. 24, 2014

(54) MOVING A PROJECT IN A COMPLEX EVENT PROCESSING CLUSTER

(75) Inventor: Dilip Sarmah, Fremont, CA (US)

(73) Assignee: Sybase, Inc., Dublin, CA (US)

(*) Notice: Subject to any disclaimer, the term of this patent is extended or adjusted under 35 U.S.C. 154(b) by 379 days.

(21) Appl. No.: 12/814,965

(22) Filed: Jun. 14, 2010

(65) Prior Publication Data

US 2011/0307552 A1 Dec. 15, 2011

(51) Int. Cl.
*G06F 15/173* (2006.01)
*G06F 15/16* (2006.01)
*G06F 9/48* (2006.01)
*G06F 11/20* (2006.01)
*H04L 29/08* (2006.01)

(52) U.S. Cl.
CPC .......... *G06F 9/4856* (2013.01); *G06F 11/2046* (2013.01); *H04L 67/2819* (2013.01); *H04L 67/2861* (2013.01); *H04L 67/34* (2013.01)
USPC .......................................... 709/226; 709/204

(58) Field of Classification Search
USPC ........................................................ 709/204
See application file for complete search history.

(56) References Cited

U.S. PATENT DOCUMENTS

| | | | | |
|---|---|---|---|---|
| 7,523,344 | B2* | 4/2009 | Qiao et al. | 714/6.32 |
| 7,581,229 | B2* | 8/2009 | Watkins et al. | 719/321 |
| 8,117,495 | B2* | 2/2012 | Graham et al. | 714/11 |
| 2002/0120697 | A1* | 8/2002 | Generous et al. | 709/206 |
| 2003/0046338 | A1* | 3/2003 | Runkis | 709/203 |
| 2003/0058277 | A1* | 3/2003 | Bowman-Amuah | 345/765 |
| 2006/0009213 | A1* | 1/2006 | Sturniolo et al. | 455/426.1 |
| 2006/0123079 | A1* | 6/2006 | Sturniolo et al. | 709/203 |
| 2006/0206904 | A1* | 9/2006 | Watkins et al. | 719/321 |
| 2006/0222163 | A1* | 10/2006 | Bank et al. | 379/221.08 |
| 2007/0294578 | A1* | 12/2007 | Qiao et al. | 714/17 |
| 2008/0281938 | A1* | 11/2008 | Rai et al. | 709/209 |
| 2010/0332629 | A1* | 12/2010 | Cotugno et al. | 709/221 |
| 2011/0041006 | A1* | 2/2011 | Fowler | 714/10 |

* cited by examiner

*Primary Examiner* — Richard G Keehn
(74) *Attorney, Agent, or Firm* — Sterne, Kessler, Goldstein & Fox P.L.L.C.

(57) ABSTRACT

System, method, computer program product embodiments and combinations and sub-combinations thereof for moving a project in a complex event processing cluster are provided. In an embodiment, project movement in a complex event processing cluster initiates once project persistence capability exists. A handoff of the project from a source node to a destination node in the complex event processing cluster is coordinated by a manager without losing messages and without relying on a message guarantee delivery protocol.

20 Claims, 4 Drawing Sheets

MOVING A PROJECT IN A COMPLEX EVENT PROCESSING CLUSTER

BACKGROUND

1. Field of the Invention

The present invention relates generally to data computing environments and, more particularly, to a system providing methodology for moving a project in a complex event processing cluster.

2. Background Art

Historically, most businesses were most concerned about the need for accurate storage, retrieval, and analysis of data. Today, businesses are operating in environments where the need to monitor events comes at an ever-accelerating pace.

Event-driven systems have typically been built around either relational databases or real-time messaging systems, or a combination of both. While these technologies have their advantages, neither is particularly well suited for managing and analyzing events in rapidly changing environments. Relational database servers can process large amounts of stored data and can analyze the information with relative ease but are not designed to operate in real-time environments, and do not provide an effective way to monitor rapidly changing data. Messaging systems permit data to be monitored in real time but generally are not capable of complex computations, correlations, pattern matching or references to historical data.

Custom applications must often be combined with these technologies to create a viable solution. However, the use of custom applications to compensate for the limitations of these technologies creates new complications. For example, custom applications become increasingly complex very quickly as an organization's need for progressively more sophisticated analysis grows. Further, custom applications are also costly to modify, and they do not scale well as organizational needs change.

Tools, such as the Sybase CEP Engine available from Sybase, Inc., of Dublin, Calif., have been developed in the field of Complex Event Processing (CEP) and Event Stream Processing (ESP) applications for use in building applications to process and analyze large volumes of fast-moving data in highly dynamic environments. These tools couple the best features of relational databases and messaging technologies, combined with many new features required for the rapidly changing world faced by today's businesses. For example, like a real-time messaging system, reactions to each new piece of data occur immediately. Like a relational database system, support exists for the use of a query language similar to SQL to process and analyze incoming data, and to correlate it with historical data. Also, sophisticated pattern-matching capabilities are provided without requiring large amounts of custom application code.

FIG. 1 illustrates a block diagram of components of an end-to-end application incorporating a complex event processing engine 100. Messages travel through the application starting from an external data source 110 to an input adapter 120. The input adapter 120 may poll the external source 110 or register for notifications or use some other mechanism to receive data. The input adapter 120 publishes messages to one or more data streams 130. The stream(s) 130 feed projects and query module(s) 140. The query module(s) 140 publish to one or more streams 150. The stream(s) 150 feed an output adapter 160. The output adapter 160 subscribes to the stream(s) 150, processes the messages, converts the data to a format suitable for the destination 170, and then transmits the output data to the destination 170. The destination 170 performs whatever actions with the data that it is designed to do.

Input and output adapters enable the CEP engine 100 to send and receive messages from dynamic and static external sources and destinations. External sources or destinations can include data feeds, sensor devices, messaging systems, radio frequency identification (RFID) readers, e-mail servers, relational databases, and the like. By way of example, a series of input adapters 120 can translate messages from data sources 110, such as a temperature sensor, bar code scanner and a Java Message Service (JMS) "cloud", into formats compatible with the CEP engine 100 for processing by several CEP queries 140 with the output adapters 160 converting the CEP result rows into updates to destinations 170, such as a database server, e-mail messages, and data for a web services dashboard.

The CEP engine 100 may process hundreds of thousands of messages per second, with latency measured in milliseconds and may run on a single processor, or may consist of multiple servers (i.e., a server cluster) distributed across multiple machines, each containing one or more processors. When a cluster is utilized, a user (or system) may need to control movement of a running CEP project from one node to another in a cluster, such as to balance the load. One basic way to move a project from one node to another would be to stop the running project in the source node and start the project in the destination node. Unfortunately, in this approach, messages which are currently in transition in the CEP may be lost. One way to avoid such losses is to enable persistence in a CEP project, so that the transit stream messages as well as status of the query engine are persisted, such as to persistent storage 180. However, this will not provide a complete solution, since messages could be in transition in the input 120 and output 160 adapters, and stopping a project may result in those messages being lost.

By enabling guarantee delivery, which is a communications protocol that provides acknowledgements from the recipient to the sender assuring that messages were delivered, message loss could be avoided, so that, together with persistence enabled, a project could be stopped and moved a project successfully. However, once you add persistence and guarantee delivery, system performance decreases significantly. Performance sensitive CEP projects (e.g., those that avoid the use of disk input/output) may not want to add persistence and guarantee delivery, and some projects may enable persistence and not guarantee delivery.

Accordingly, a need exists for an approach to provide efficient and successful project movement in a CEP cluster that avoids the problems of the prior art. The present invention addresses such as need.

BRIEF SUMMARY

Briefly stated, the invention includes system, method, computer program product embodiments and combinations and sub-combinations thereof for moving a project in a complex event processing cluster are provided. In an embodiment, project movement in a complex event processing cluster initiates once project persistence capability exists. A handoff of the project from a source node to a destination node in the complex event processing cluster is coordinated by a manager without losing messages and without relying on a message guarantee delivery protocol.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

FIG. 1 illustrates a block diagram of components of an end-to-end application incorporating a complex event processing engine.

FIGS. 2a, 2b, and 2c illustrate block diagrams of an example of a complex event processing cluster in which a project is moved from one node to another in accordance with an embodiment of the present invention.

Figure 1:
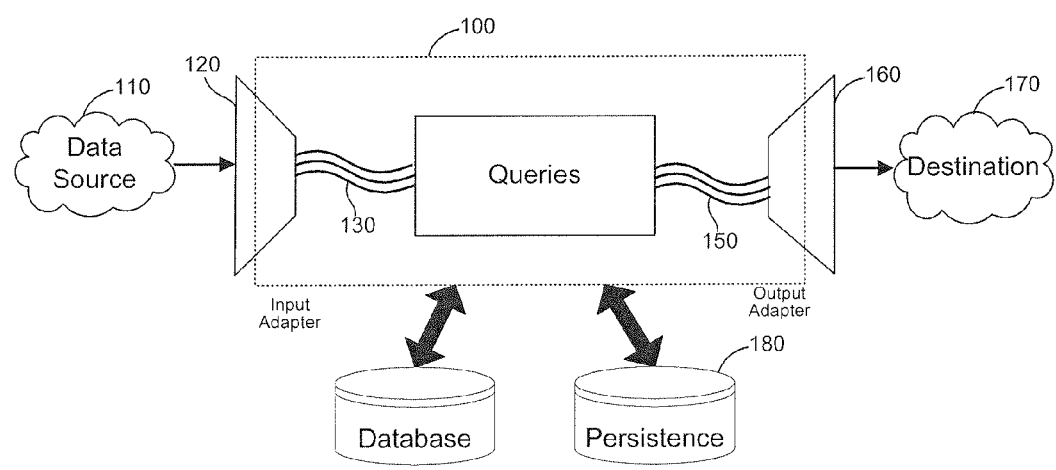

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for moving a project in a complex event processing cluster.

In the following description, reference is made concurrently to an example cluster arrangement of CEP servers represented in FIGS. 2a, 2b, and 2c in order to demonstrate changes in connections as a project is moved from one node to another in accordance with an embodiment of the invention, as represented in the block flow diagram of FIG. 3. In general, and for purposes of this discussion, a cluster arrangement includes a cluster manager that monitors containers and manages their workload, including coordinating the work among the containers. The work of containers includes not only the running of queries but also the running of streams and adapters. Every cluster suitably contains one or more containers, which are managed by a single active manager. As previously mentioned, the Sybase CEP Engine available from Sybase, Inc., of Dublin, Calif., is suitable for implementing the CEP servers within the cluster arrangement.

Figure 2A:
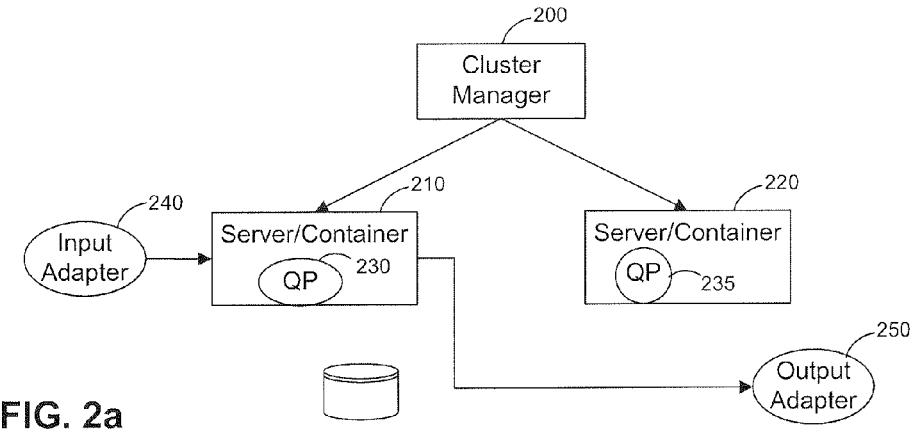
Figure 3:
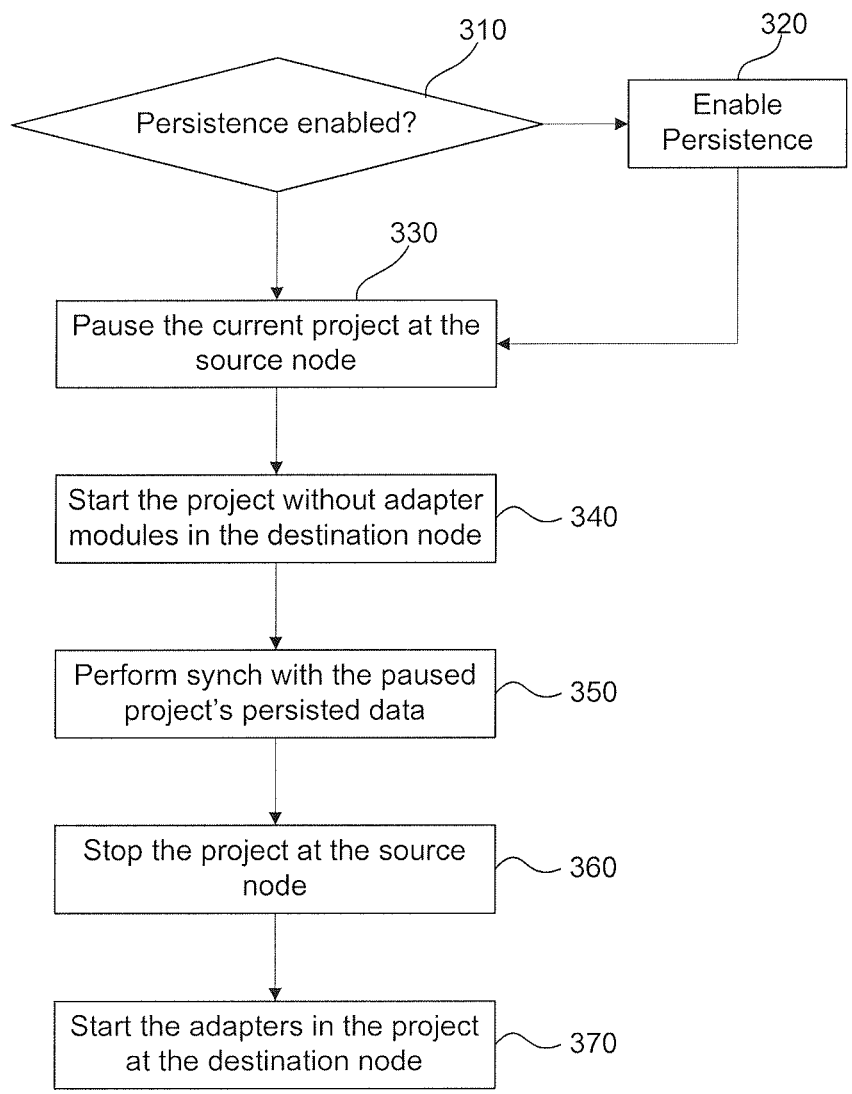
FIG. 3 illustrates a flowchart of an overall process by which a project in a project is moved in a complex event processing cluster in accordance with an embodiment of the present invention.

Referring first to FIG. 2a, a cluster manager is running in a first node 200, while containers are running in second node 210 and a third node 220. An assumption is made that a project currently running in query processor (QP) 230 of node 210 is to be moved to node 220 for running by QP 235 and that a reliable messaging protocol (e.g., guarantee delivery) for the adapters 240, 250 is not enabled. The project moving coordination is done by the cluster manager 200.

When cluster manager 200 initiates a process to move a project from node 210 to node 220, such as for load rebalancing, a check is done to determine whether the project has persistence enabled (block 310, FIG. 3), and when not enabled, enables it (block 320). This is referred to herein as "just in time" persistence and will let the project run till a state of the project is completely persisted.

Figure 2B:
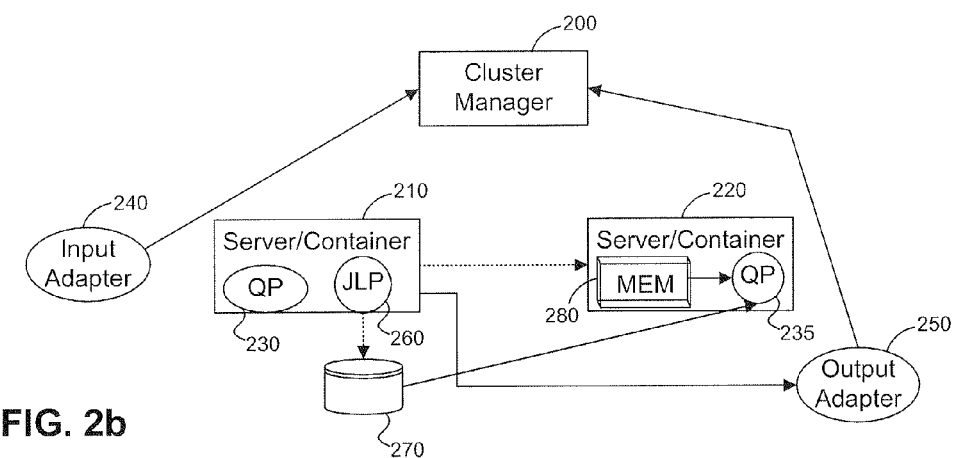
Figure 2C:
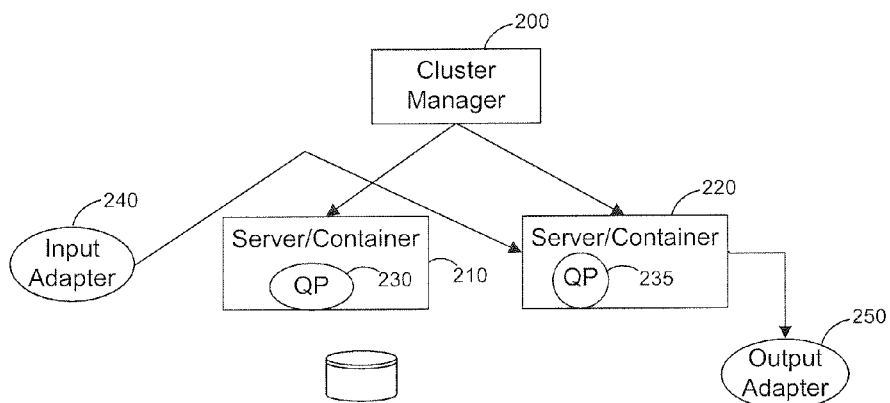

With persistence active, the cluster manager 200 then pauses the current project by pausing the input adapter 240 (block 330), represented by FIG. 2b, in which the arrow link between the input adapter 240 and node 210 has been removed. Once the incoming messages are paused, the query processor 230 will only need to process the existing messages in the system. Input adapters 240 will buffer the messages and wait for instruction to deliver to the query processor 235. As further shown in FIG. 2b, a JIP (just in time persistence) module 260 is represented for providing the data persistence (storing stream messages, messages in transit and status of the query processing/operation). Connections to a disk memory 270 and to system memory 280 are also represented, since, depending on the configuration, the data persistence can be done in the disk 270 or in the memory 280 (such as distributed cache), as is well understood in the art. Persisting in memory is expected to be faster than disk and may be desirable for better performance, since the faster the persistence operation, the shorter the "pause" time for input adapters.

Then, the destination node for the project, node 220, is requested to start the project without adapters (block 340). This ensures there are no input messages into the query graph, with the project instantiated, but not running, in the destination node 220. In this state, the project is synchronized with the persisted data from the source node 210 (block 350) once the persistence operation is completed in the source node 210. The persisted messages are read from either from the disk 270 or memory 280, depending upon the configuration. Once the synch up is completed, the project at the source node 210 is stopped (block 360) and the adapters (output and input) of the project in the destination node 220 are started (block 370), as represented by the set of connections illustrated via the arrows in FIG. 2c. In this manner, the transfer of a project from one node to another in a CEP system is successfully completed in an efficient and accurate manner without significantly impacting system performance.

Some consideration may need to be made if the input and output adapters are "out-of-process" adapters, which refers to adapters that run as a separate process, rather than as part of the server. For an out-of-process input adapter to connect to an input stream and write data to that stream, the adapter must know the URI (Uniform Resource Identifier) of that stream. Similarly, an out-of-process output adapter must know the URI of the stream from which it will read. As is generally understood, each data stream has a unique stream URI, which provides enough information that a program can connect to that stream.

Thus, while the cluster manager 200 can manage the life cycle (start, pause, stop etc.) of in-process adapters, for out-of-process ones, the cluster manager 200 may not able to do it. In such a situation, an output-of-process adapter needs to have awareness of the possibility of moving projects inside the cluster without its knowledge and needs to be able to resolve the URI from the cluster manager 200 whenever the destination project does not appear to be running in the destination node. In an embodiment, resolution of the new URI of a project for an out-of-process adapter occurs through reconnection to the cluster manager 200 whenever a connection is lost. It is also important in such situations that an out-of-process input adapter buffer that messages that it is trying to deliver when the connection is lost to the stream and deliver them when connection is reestablished, as is well appreciated by those skilled in the art.

Figure 4:
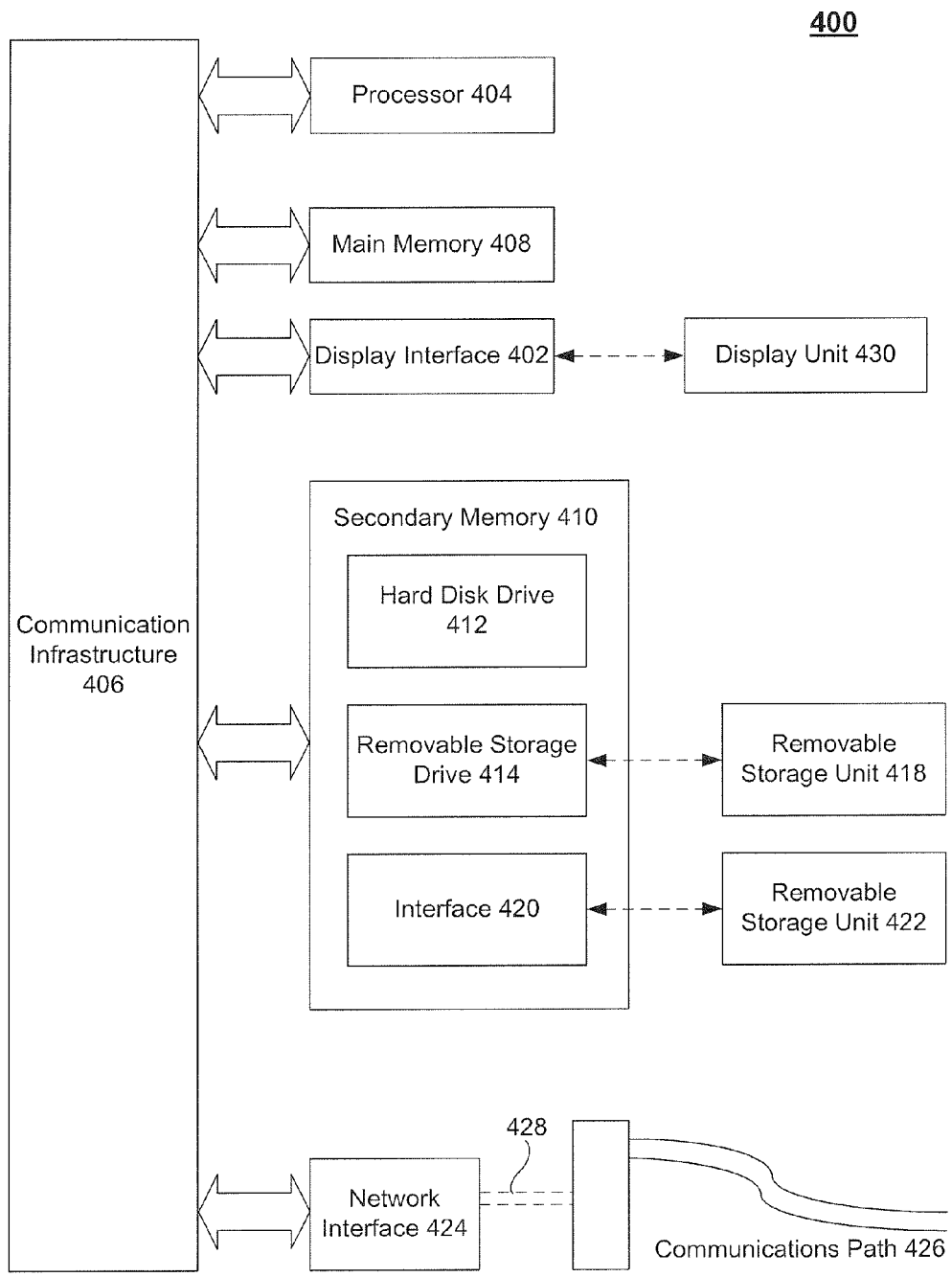
FIG. 4 illustrates an example computer useful for implementing components of embodiments of the invention.

Various aspects of the present invention can be implemented by software, firmware, hardware, or a combination thereof. FIG. 4 illustrates an example computer system 400, such as capable of acting as the servers in the cluster of FIGS. 2a, 2b, and 2c, in which the present invention, or portions thereof, can be implemented as computer-readable code. For example, the methods illustrated by flowchart of FIG. 3 can be implemented in system 400. Various embodiments of the invention are described in terms of this example computer system 400. After reading this description, it will become apparent to a person skilled in the relevant art how to implement the invention using other computer systems and/or computer architectures.

Computer system 400 includes one or more processors, such as processor 404. Processor 404 can be a special purpose or a general purpose processor. Processor 404 is connected to a communication infrastructure 406 (for example, a bus or network).

Computer system 400 also includes a main memory 408, preferably random access memory (RAM), and may also include a secondary memory 410. Secondary memory 410 may include, for example, a hard disk drive 412, a removable storage drive 414, and/or a memory stick. Removable storage drive 414 may comprise a floppy disk drive, a magnetic tape drive, an optical disk drive, a flash memory, or the like. The removable storage drive 414 reads from and/or writes to a removable storage unit 418 in a well known manner. Removable storage unit 418 may comprise a floppy disk, magnetic tape, optical disk, etc. which is read by and written to by removable storage drive 414. As will be appreciated by persons skilled in the relevant art(s), removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 are in the form of signals which may be electronic, electromagnetic, optical, or other signals capable of being received by communications interface 424. These signals are provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard disk drive 412. Signals carried over communications path 426 can also embody the logic described herein. Computer program medium and computer usable medium can also refer to memories, such as main memory 408 and secondary memory 410, which can be memory semiconductors (e.g. DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement the present invention as discussed herein. In particular, the computer programs, when executed, enable processor 404 to implement the processes of the present invention, such as the method illustrated by the flowchart of FIG. 3. Accordingly, such computer programs represent controllers of the computer system 400. Where the invention is implemented using software, the software may be stored in a computer program product and loaded into computer system 400 using removable storage drive 414, interface 420, hard drive 412 or communications interface 424.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for moving a project in a complex event processing cluster, tile method comprising:
    initiating movement of the project in a cluster arrangement of systems utilized for processing complex events and queries, including incoming messages in transit to and for query processing by the project, once project persistence, including query persistence, capability exists;
    coordinating a handoff of the project from a source node to a destination node in the cluster by a manager without losing the incoming messages or the queries and without reliance on a message guarantee delivery protocol, wherein the handoff comprises a movement of the project, including data associated with the project, from the source node to the destination node, and wherein the incoming messages and queries are received by the project at the destination node during a synchronization of the project at the destination node; and
    wherein the query persistence comprises storing stream messages, messages in transit and status of the query processing in a distributed cache until a completion of the synchronization.

2. The method of claim 1 further comprising ensuring just in time persistence if project persistence has not been enabled before initiating project movement in the cluster.

3. The method of claim 1 wherein coordinating further comprises pausing the project at the source node and perforating data persistence.

4. The method of claim 3 wherein coordinating further comprises starting the project at the destination node without starting adapters at the destination node, wherein the adapters enable the destination node to send outgoing messages and receive additional incoming messages.

5. The method of claim 4 wherein coordinating further comprises synchronizing the data persisted with the project at the destination node.

6. The method of claim 5 wherein coordinating further comprises stopping the project at the source node.

7. The method of claim 6 wherein coordinating further comprises starting the adapters at the destination node.

8. A system having a cluster arrangement of systems utilized for processing complex events and queries comprising:
one or more hardware processors;
a source node for a project;
a destination node for the project; and
a cluster manager that when executed by the one or more processors causes the one or more processors to:
initiate movement of the project in a cluster arrangement of systems utilized for processing complex events and queries, including incoming messages in transit to and for query processing by the project, once project persistence, including query persistence, capability exists,
coordinate a handoff of the project from the source node to the destination node without losing the incoming messages or the queries and without relying on a message guarantee delivery protocol, wherein the handoff comprises a movement of the project, including data associated with the project, from the source node to the destination node, and wherein the incoming messages and queries are received by the project at the destination node during a synchronization of the project at the destination node; and
wherein the query persistence comprises storing stream messages, messages in transit and status of the query processing in a distributed cache until a completion of the synchronization.

9. The system of claim 8 wherein the cluster manager further causes the one or more processors to ensure just in time persistence if project persistence has not been enabled before initiating project movement.

10. The system of claim 8 wherein the cluster manager further causes the one or more processors to pause the project at the source node, and the source node persists project data.

11. The system of claim 10 wherein the cluster manager further causes the one or more processors to start the project at the destination node without starting adapters at the destination node, wherein the adapters enable the destination node to send outgoing messages and receive additional incoming messages.

12. The system of claim 11 wherein the project at the destination node synchronizes with the persisted project data.

13. The system of claim 12 wherein the cluster manager timber causes the one or more processors to stop the project at the source node, and starts the adapters at the destination node.

14. A computer program product including a non-transitory computer-readable medium having instructions stored thereon that, if executed by a computing device, cause the computing device to perform operations for moving a project in a cluster arrangement of systems utilized for processing complex events and queries, the instructions comprising:
initiating movement of the project in a cluster arrangement of systems utilized for processing complex events and queries, including incoming messages in transit to and for query processing by the project, once project persistence, including query persistence, capability exists;
coordinating a handoff of the project from a source node to a destination node in the cluster by a manager without losing the incoming messages or the queries and without relying on a message guarantee delivery protocol, wherein the handoff comprises a movement of the project, including data associated with the project, from the source node to the destination node, and wherein the incoming messages and queries are received by the project at the destination node during a synchronization of the project at the destination node; and
wherein the query persistence comprises storing stream messages, messages in transit and status of the query processing in a distributed cache until a completion of the synchronization.

15. The computer program product of claim 14 further comprising ensuring just in time persistence if project persistence has not been enabled before initiating project movement in the cluster.

16. The computer program product of claim 14 wherein coordinating further comprises pausing the project at the source node and performing data persistence.

17. The computer program product of claim 16 wherein coordinating further comprises starting the project at the destination node without starting adapters at the destination node, wherein the adapters enable the destination node to send outgoing messages and receive additional incoming messages.

18. The computer program product of claim 17 wherein coordinating further comprises synchronizing the data persisted with the project at the destination node.

19. The computer program product of claim 18 wherein coordinating timber comprises stopping file project at the source node.

20. The computer program product of claim 19 wherein coordinating further comprises starting tile the adapters at the destination node.

* * * * *